United States Patent
Salloum et al.

(10) Patent No.: US 9,651,649 B1
(45) Date of Patent: May 16, 2017

(54) PASSIVE ACOUSTIC DETECTION, TRACKING AND CLASSIFICATION SYSTEM AND METHOD

(71) Applicant: THE TRUSTEES OF THE STEVENS INSTITUTE OF TECHNOLOGY, Hoboken, NJ (US)

(72) Inventors: Hady Salloum, Glen Ridge, NJ (US); Alexander Sedunov, Jersey City, NJ (US); Nikolay Sedunov, Jersey City, NJ (US); Alexander Sutin, Summit, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 286 days.

(21) Appl. No.: 14/209,548

(22) Filed: Mar. 13, 2014

Related U.S. Application Data

(60) Provisional application No. 61/782,478, filed on Mar. 14, 2013.

(51) Int. Cl.
  *G01S 3/80* (2006.01)
  *G01S 3/802* (2006.01)

(52) U.S. Cl.
  CPC .................. *G01S 3/802* (2013.01)

(58) Field of Classification Search
  CPC ............. G01S 15/00; G01S 3/80; G01S 3/802
  See application file for complete search history.

(56) References Cited

U.S. PATENT DOCUMENTS

| | | | |
|---|---|---|---|
| 4,494,938 A | 1/1985 | Flood et al. | |
| 4,975,886 A | 12/1990 | Ellingson | |
| 5,034,930 A | 7/1991 | Clearwaters | |
| 5,099,456 A * | 3/1992 | Wells ................ | G01S 3/808 367/127 |
| 5,138,587 A | 8/1992 | Mason | |
| 5,146,208 A | 9/1992 | Parra | |
| 5,278,774 A | 1/1994 | Wilson | |

(Continued)

FOREIGN PATENT DOCUMENTS

WO     2011/056830 A1     5/2011

OTHER PUBLICATIONS

Meng, Distributed algorithm for hybrid TOA/DOA-based source localization, Industrial Electronics and Applications (ICIEA), 2011 6th IEEE Conference, Jun. 21-23, 2011, pp. 1046-1049.*

(Continued)

*Primary Examiner* — Luke Ratcliffe
*Assistant Examiner* — Hovhannes Baghdasaryan
(74) *Attorney, Agent, or Firm* — Greenberg Traurig, LLP

(57) ABSTRACT

An acoustic sensing system and method includes at least one cluster of acoustic sensors in communication with a computing device. The computing device is configured to process received acoustic signals, and provide at least one of detection of the acoustic source presence; determination of direction of arrival of an acoustic wave emitted by an acoustic source; and classification of the acoustic source as to its nature. The cluster may include at least two sensors and the computing device may be configured to process the received acoustic signals and provide localization of the acoustic source in three dimensions. The cluster of acoustic sensors may comprise at least one seismic wave sensor.

16 Claims, 10 Drawing Sheets

(56) References Cited

U.S. PATENT DOCUMENTS

| | | | |
|---|---|---|---|
| 5,337,053 A * | 8/1994 | Dwyer | G01S 7/415 342/192 |
| 5,377,162 A | 12/1994 | Jestin et al. | |
| 5,410,519 A | 4/1995 | Hall et al. | |
| 5,483,500 A * | 1/1996 | Capell, Sr. | G01S 3/805 367/119 |
| 5,557,584 A | 9/1996 | Suchman | |
| 5,619,616 A * | 4/1997 | Brady | G01H 3/08 706/20 |
| 5,841,735 A | 11/1998 | Quazi | |
| 5,909,409 A | 6/1999 | Barber et al. | |
| 5,930,202 A * | 7/1999 | Duckworth | G01S 5/20 367/124 |
| 6,038,924 A | 3/2000 | Lee et al. | |
| 6,082,193 A | 7/2000 | Paulson | |
| 6,160,758 A | 12/2000 | Spiesberger | |
| 6,424,596 B1 * | 7/2002 | Donald | G01S 3/86 367/124 |
| 6,697,302 B1 | 2/2004 | Cray et al. | |
| 6,813,220 B2 | 11/2004 | Hicks et al. | |
| 6,859,420 B1 | 2/2005 | Coney et al. | |
| 6,922,145 B2 | 7/2005 | Piesinger | |
| 7,245,559 B2 | 7/2007 | McDonald et al. | |
| 7,266,044 B2 | 9/2007 | Yang | |
| 7,457,198 B2 | 11/2008 | Stein et al. | |
| 7,463,554 B2 | 12/2008 | Kervern | |
| 7,495,998 B1 * | 2/2009 | Deligeorges | G01S 3/8006 367/127 |
| 7,536,913 B2 | 5/2009 | Naluai et al. | |
| 7,587,291 B1 | 9/2009 | Sarvazyan et al. | |
| 7,760,587 B2 | 7/2010 | Abbot et al. | |
| 7,926,614 B2 | 4/2011 | Tenghamn et al. | |
| 8,107,320 B2 | 1/2012 | Novick et al. | |
| 8,534,959 B2 | 9/2013 | Thompson et al. | |
| 2002/0082756 A1 * | 6/2002 | Breed | G01S 15/04 701/45 |
| 2004/0075738 A1 * | 4/2004 | Burke | G08B 13/19656 348/143 |
| 2007/0159922 A1 * | 7/2007 | Zimmerman | G01S 7/52004 367/103 |
| 2011/0007606 A1 | 1/2011 | Curtis | |

OTHER PUBLICATIONS

Chin-Hsing, "Classification of Underwater Signals Using Neural Networks", Tamkang Journal of Science and Engineering, vol. 3, No. 1, pp. 31-48 (2000).*

Berliner, M. et al., Acoustic Particle Velocity Sensors: Design, Performance, and Applications, J. Acoust. Soc. Am., vol. 100, No. 6 (1966) 3478-3479.

Gabrielson, T. et al., A simple neutrally buoyant sensor for direct measurement of particle velocity and intensity in water, J. Acoust. Soc. Am., vol. 97, No. 4, (1995) 2227-2237.

Mellema, G.R., Correlation Based Testing for Passive Sonar Picture Rationalization, Defense R&D Canada—Atlantic, Dartmouth, Information Fusion, 2007 10th Internatiol Conference.

Quazi, A., An Overview of the Time Delay Estimate in Active and Passive Systems for Target Localization, IEEE Trans. Acoust., Speech, Signal Processing, vol. ASSP-29, No. 3 (1981) 527-533.

Sedunov, A. et al., Automated passive acoustic intruder detection based on correlation approach, J. Acoust. Soc. Am., vol. 24, Iss 4, (2008) 2561.

Spiesberger, J., Identifying Cross-Correlation Peaks Due to Multipaths with Application to Optimal Passive Localization of Transient Signals and Tomographic Mapping of the Environment, J. Acoust. Soc. Am., vol. 100, No. 2, Pt. 1, (1996) 910-917.

Xerri, B., Passive Tracking in Underwater Acoustic, Signal Processing, 82 (B), (2002) 1067-1085.

Zarnich, R.E., A Fresh Look at Broadband Passive Sonar Processing, 1999 Adaptive Sensor Array Processing Workshop (ASAP '99), MIT Lincoln Laboratory, Lexington, MA (1999) 99-104.

Non-Final Office Action mailed Dec. 6, 2011 in regard to U.S. Appl. No. 12/938,708.

International Search Report and Written Opinion mailed Mar. 21, 2011 in regard to PCT Application No. PCT/US10/55230.

European Search Report and European Search Opinion mailed Mar. 25, 2013 in regard to European Patent Application No. 10829003.2.

Non-Final Office Action mailed May 6, 2011 in regard to U.S. Appl. No. 12/414,819.

* cited by examiner

PASSIVE ACOUSTIC DETECTION, TRACKING AND CLASSIFICATION SYSTEM AND METHOD

CROSS-REFERENCE TO RELATED APPLICATIONS

The present application claims the benefit of U.S. Provisional Patent Application No. 61/782,478, filed on Mar. 14, 2013, which is incorporated by reference herein in its entirety.

STATEMENT REGARDING FEDERALLY SPONSORED RESEARCH

Some of the research performed in the development of the disclosed subject matter was supported by the U.S. Department of Homeland Security ("DHS") contract number HSHQDC-10-A-BOA35. The U.S. government may have certain rights with respect to this application.

FIELD OF THE DISCLOSED SUBJECT MATTER

The disclosed subject matter relates to a high resolution low-noise multidimensional system and method for tracking and identifying sources of acoustic, seismic, and/or hydro-acoustic waves to detect the presence of man-made or natural sources of acoustic emissions, and for classification of the type of source causing the emissions, the bearing to the source, the direction the source is moving, and the three-dimensional location of the source.

BACKGROUND OF THE DISCLOSED SUBJECT MATTER

Passive acoustic sensor technology provides multiple benefits for detection and localization of various targets of interest that produce acoustic waves. Passive sensors rely on the target's own emissions, and, thus, do not have to emit any signals. Such passive sensors are covert, energy-efficient, and environmentally friendly. Any source that emits acoustic signals (i.e., an "acoustic sensor") may be a target of interest. Examples of targets of interest in air can be various aircraft (e.g., small planes, helicopters, and ultra-light aircraft), Unmanned Aerial Vehicles ("UAV"), drones, and birds. Vehicles on ground surface, surface watercraft, and animals can also produce detectable acoustic waves that propagate in air. Acoustic waves generated by airborne sources can also excite ground vibrations that can be recorded by seismic sensors. For the purposes of the present disclosure, seismic sources and sensors are considered, generally, to be among the group of acoustic sources and sensors. Seismic sensors can be used for detection, tracking and classification of airborne and ground targets including vehicles, people, any machinery working on or touching the ground. The passive acoustic methods in water can be used for detection of submarines, boats, underwater vehicles and SCUBA divers and surface swimmers, fish and marine mammals. For the purposes of the present disclosure, such hydro-acoustic sources and sensors are also considered, generally, to be among the group of acoustic sources and sensors.

An acoustic sensor can include any transducer that converts acoustic waves into electrical signals. Typical acoustic sensors include microphones for acoustic waves in air, hydrophones for acoustic waves in water, and geophones for seismic waves. Numerous acoustic detection and tracking systems apply acoustic arrays consisting of many sensors. Such arrays are large and expensive. For example the length of a towing array for submarine detection by a Surveillance Towed Array Sensor System (SURTASS) is about 1.5 km.

Low cost acoustic sensors are used in devices such as Unattended Ground Sensors (UGS), which are used for personnel and vehicle detection and for battlefield surveillance. Acoustic target detection using single or multiple sensors is usually performed by detecting the level of acoustic signal exceeding a definite threshold. Acoustic target localization using several sensors is based on the determination of the Time Difference of Arrival (TDOA) for several sensors.

Various methods that determine the Time Difference of Arrival (TDOA) of an acoustic wave onto a pair of sensors are well known, along with efficient algorithms which may be used to compute TDOA. The TDOA estimate depends on the direction of arrival of the acoustic wave onto the pair of sensors. A minimal subset of pairs required to determine the direction of arrival is one pair for a two-dimensional case, where one can assume, a priori, that the target is in a certain plane, and two pairs for a three-dimensional case. Using the knowledge of the sensor geometry and the uncertainty of the TDOA estimate, one can determine the uncertainty of the direction-of-arrival measurement. An example of such a system is disclosed in U.S. Pat. No. 8,195,409, entitled PASSIVE ACOUSTIC UNDERWATER INTRUDER DETECTION SYSTEM, issued to Bruno, et al. on Jun. 5, 2012 and assigned to the assignee of the present application, the disclosure of which patent is hereby incorporated by reference for all purposes, and as if copied in the present application in full including all of the drawings and the claims.

Some of such algorithms used to determine direction or TDOA of an acoustic wave can provide only one estimate (for example, an estimate of TDOA for the signal source of the strongest signal, if there are several sources), while others are able to provide multiple estimates corresponding to several sources present simultaneously. For example, generalized cross-correlation algorithms produce peaks at the values of delays corresponding to TDOA of received signals from each of the sources, and, when combined with a peak detector, they can yield multiple TDOA estimates. Signals from multiple acoustic sources arriving onto a compactly-deployed acoustic sensor cluster may be separated by the direction of arrival.

If multiple estimates are produced from multiple pairs of sensors, and if those measurements must be considered simultaneously, a data association problem arises, as there is a need for an additional method to determine which of the TDOA estimates from one pair of sensors corresponds to the same wave that originated another estimate from another pair of sensors. In cases where the sensors are deployed in remote locations, it is a common problem that very limited resources are available (e.g., power, computational resources, communication bandwidth, or storage capacity). There is a need for a robust method to determine when the functionality consuming those resources is invoked.

A typical air acoustic wave sensor (e.g., a microphone) consists of a single element, such as an electret capsule, a ceramic element, etc. Such transducers can vary in cost depending on their properties, with high-end products providing high performance (in terms, e.g., of minimal self-noise and bandwidth sensitivity), but costing orders of magnitude more than lower-performance sensors. Such elements need additional electronics to supply power and pre-amplification. When connecting to devices responsible for processing signals, such sensors typically have to be supplemented with signal-conditioning electronics, such as multiple stages of amplifiers and filters.

SUMMARY OF THE DISCLOSED SUBJECT MATTER

An acoustic sensing system and method may include at least one cluster of acoustic sensors in communication with a computing device configured to process the received acoustic signals and to provide at least one of: detection of the presence of an acoustic source; determination of the direction of arrival of an acoustic wave emitted by the acoustic source; and classification of the acoustic source. When at least two sensor clusters are used, the computing device may be configured to process the received acoustic signals and provide localization of the acoustic source. The cluster of acoustic sensors may include at least one pair of seismic wave sensors. The acoustic sensor may include a high sensitivity and low self-noise acoustic sensor, which may itself include a plurality of interfaced sensor elements. The cluster of acoustic sensors may include a minimal subset of sensors selected by the algorithm running on the computing device to provide the best estimate of the direction of arrival of an acoustic wave based on the geometry of the arrangement of the sensors in the minimal subset. The computing device of the acoustic sensing system may be configured to extract and track at least one tonal component in the spectrum of a signal acquired by at least one of an acoustic, a hydro-acoustic, or a seismic sensor, and provide one or both of target presence detection and target classification, based upon at least one tonal component in the signal from the acoustic, hydro-acoustic or seismic sensor.

Also disclosed is a tangible, non-transitory machine-readable medium storing instructions that, when executed by a computing device, cause the computing device to perform a method that may comprise the steps of: processing acoustic signals received from at least one cluster of acoustic sensors; sensing the presence of at least one acoustic source; determining the direction of arrival of an acoustic wave emitted by the acoustic source; and classifying the acoustic source.

BRIEF DESCRIPTION OF FIGURES

For a more complete understanding of the present invention, reference is made to the following detailed description of an exemplary embodiment considered in conjunction with the accompanying drawings, in which.

DETAILED DESCRIPTION

Figure 1:
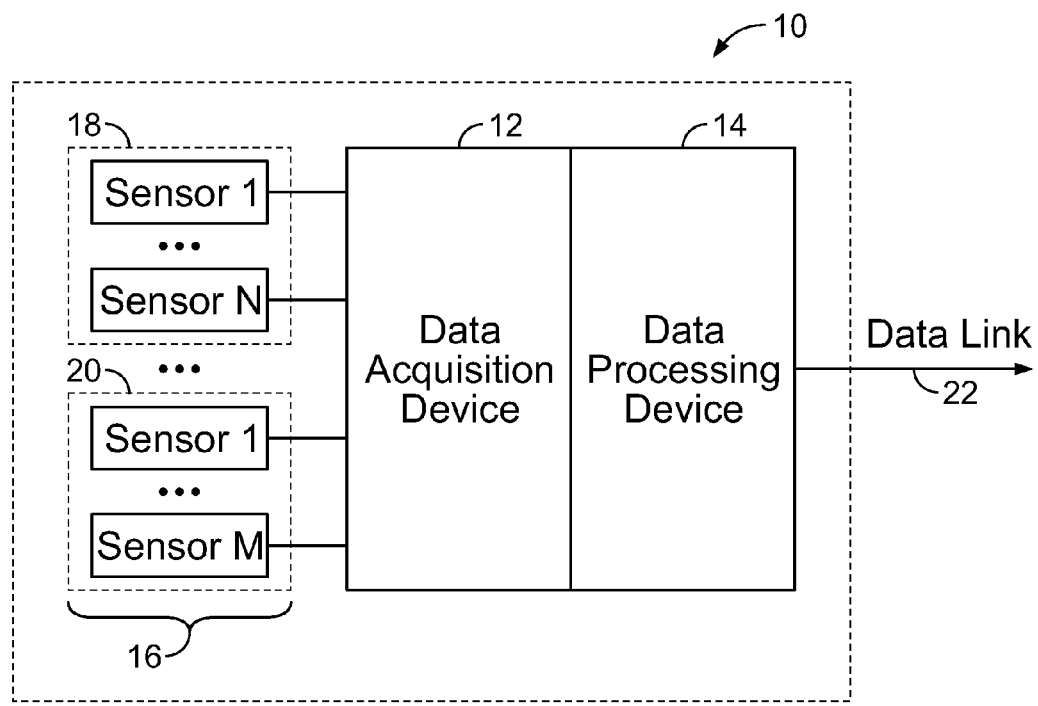
FIG. 1 is a schematic block diagram of a multi-media passive acoustic detection, tracking and classification system in accordance with an embodiment of the present invention.

An embodiment of the present invention provides a system that may consist of one or more clusters of acoustic sensors connected to a device (e.g., a computer having been suitably programmed) that can process the received acoustic signals so as to detect the presence of the acoustic source, determine the direction of arrival of an acoustic wave emitted by an acoustic source (also referred to herein as the "target") or multiple acoustic sources, and provide classification of an acoustic source. Two or more of such clusters may additionally allow localization of one or more sources emitting acoustic waves. In other embodiments, the methods that are part of the present invention may perform the aforesaid functions with respect to flying targets, targets on the water surface, underwater targets, and/or targets on the ground surface. Embodiments of the present invention may combine seismic sensors with other acoustic sensors.

As used in the present disclosure and the appended claims, terms including "acoustic" or its derivative terms (i.e., "acoustic sensor", "acoustic device", "acoustic source", "acoustic signal", "acoustic radiation", etc.) pertain, collectively, to waves emitted through the air, water, (e.g., "hydro-acoustic"), or the earth (e.g., "seismic"), unless stated otherwise.

Embodiments of the present invention include acoustic sensors that provide high performance in terms of low self-noise and high sensitivity while adding a degree of failure tolerance, and which can be manufactured using inexpensive materials.

Embodiments of the present invention interface a plurality of sensor elements with a relatively small number of electronic components to create a sensor having low self-noise and high sensitivity while adding a degree of failure tolerance, and which can be manufactured using inexpensive materials. Embodiments of the present invention also include a set of features for environmental protection of the sensor in outdoor usage.

Embodiments of the present invention include a method for determining a direction of arrival of an acoustic wave onto a cluster of acoustic sensors in three dimensions using time difference of arrival (TDOA) estimates. Embodiments of the present invention include a method for the selection of a minimal subset of sensors to provide of best estimate of a direction of arrival of an acoustic wave based on geometry of sensor placement. Embodiments of the present invention include a method providing an arrangement of acoustic sensors that can be used with simplified method of calculation of direction, suitable for an embedded acoustic system.

Embodiments of the present invention include a method for extraction and tracking of the tonal components in the spectrum of a signal acquired by acoustic, hydro-acoustic or seismic sensors that can detect the presence of targets whose acoustic emissions have tonal components. Embodiments of the present invention include a method for acoustic target localization in three dimension using two or more sensor clusters. Embodiments of the present invention include a method for acoustic signature classification using tonal components in the spectrum of the received signals. Embodiments of the present invention include a method for fusion of acoustic and seismic data to increase detection distance and probability of detection. Embodiments of the present invention include a method for data reduction prior to data transmission to a command center.

FIG. 1 is a schematic block diagram of one unit 10 of a multi-media passive acoustic detection, tracking and classification system (also referred to as a "field station") in accordance with an embodiment of the present invention. In an embodiment, the unit 10 includes electronics 12, 14 for enabling data acquisition, processing and communication functionality. A plurality of sensors is deployed in a compact cluster 16 in the proximity of the electronics. The sensors can be of one or more types, such as acoustic sensors 18 (for waves transmitted in air), seismic sensors 20, or hydro-acoustic sensors (not shown). The sensors 18, 20 are connected electrically to the data acquisition electronics 12 that are responsible for digitizing the electrical signals into a digital representation of the received acoustic signal, and transmitting it to the data processing device 14. In another embodiment, the data acquisition functionality may be built into the sensors 18, 20 and communicated digitally to the processing device 14. In another embodiment, the sensors may have a wireless link to the one or both of the data acquisition and processing devices. In an example of such an embodiment, a wireless link is built into each sensor, and the signal is communicated to a receiver connected to a data acquisition device. The processing device 14 performs signal processing on the acquired signals, and is able to communicate the results of the processing over a wireless or wired link 22.

Figure 2:
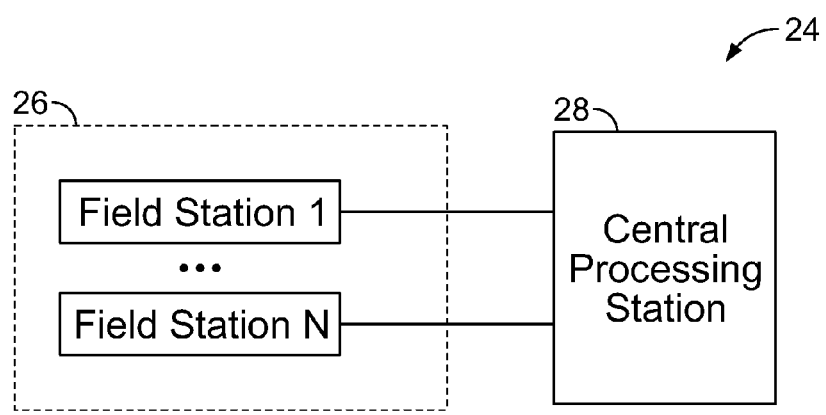
FIG. 2 is a schematic block diagram of a wide area surveillance system according to aspects of an embodiment of the present invention.

FIG. 2 is a schematic block diagram of a wide area surveillance system 24 in accordance with an embodiment of the present invention. The wide area surveillance system 24 includes a plurality of field stations 26 communicating over wired or wireless links to a central processing station 28, where advanced signal processing and data fusion techniques may be used to acquire information that interests the user. The results may be communicated for further processing and aggregation or displayed to the user. In an embodiment, the field stations 26 communicate the result of target detection, direction finding relative to multiple separate acoustic sources, and feature vectors extracted from data to be used for classification of the targets. In another embodiment, the field stations 26 communicate the sampled signal from the field stations 26, compressed to reduce the communication bandwidth required, to the central processing station 28, and the direction finding and detection of targets is performed on the central processing station 28 where more computational resources may be available. In an embodiment, the directions of arrival of acoustic waves onto the sensor clusters of individual field stations 26 are used to provide target location in three-dimensional estimates by intersecting the directions of arrival from multiple locations.

Figure 3:
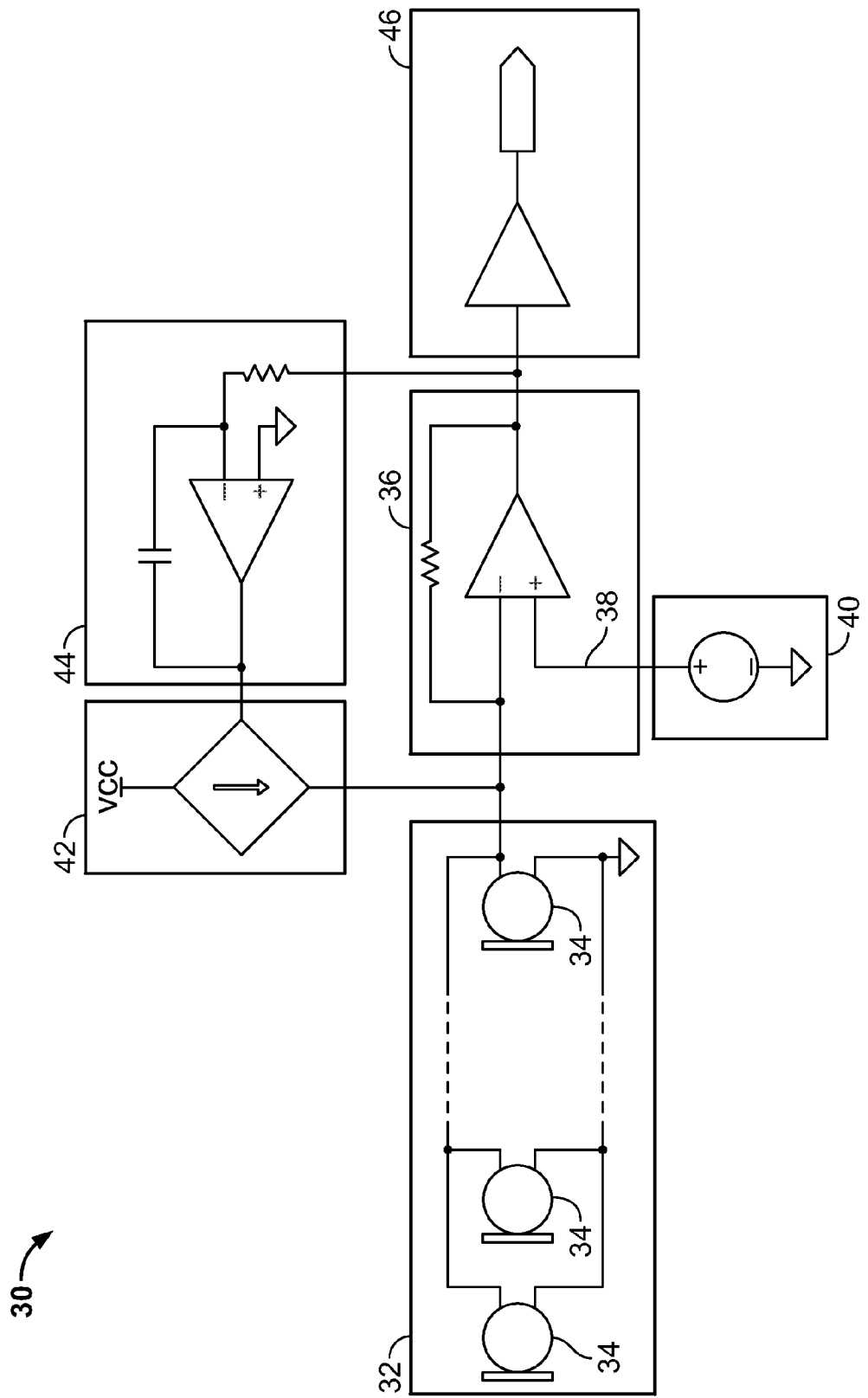
FIG. 3 is an electrical functional block diagram of an acoustic sensor having electret condenser microphones in accordance with an embodiment of the present invention.

FIG. 3 is an electrical functional block diagram of an acoustic sensor 30 having an electret condenser microphone cluster 32 in accordance with an embodiment of the present invention. The electret condenser microphone capsules 34 are connected in parallel. Their output is connected to signal amplifier 36, the non-inverting input lead 38 of which is connected to a voltage reference source 40. Such a connection allows the signal amplifier 36 to amplify the signal from the capsules 34 and to apply voltage to power the microphones (not shown). To maintain constant voltage on the output from microphones, a controlled current source 42 is introduced, the output of which is controlled by an error amplifier 44. Optionally, a voltage buffer amplifier 46 is added to the output of the amplifier 36 to drive the signal over a longer cable.

The resulting output signal from the signal amplifier 36 is the sum of the outputs of multiple capsules 34, and signal amplifier 36 also applies an additional gain to the signal. As a result, the output signal is:

$$AS = S * N * G \quad \text{(Eq. 1)}$$

Where: AS=array sensitivity,
S=capsule sensitivity, mV/Pa
N=number of capsules in the array, and
G=additional gain of the signal amplifier 36.

Such a connection may provide an increased sensitivity as compared to the sensitivity of a single capsule 34, and failure of some of the capsules 34 results in graceful performance degradation as opposed to complete failure if only a single capsule 34 is used. The sensor 30 produces an amplified signal of a sufficiently high level that can be directly fed into data acquisition devices without need for further amplification, thus potentially improving the signal-to-interference ratio for any interference induced in the connectors between the sensor 30 and the data acquisition electronics.

Figure 4:
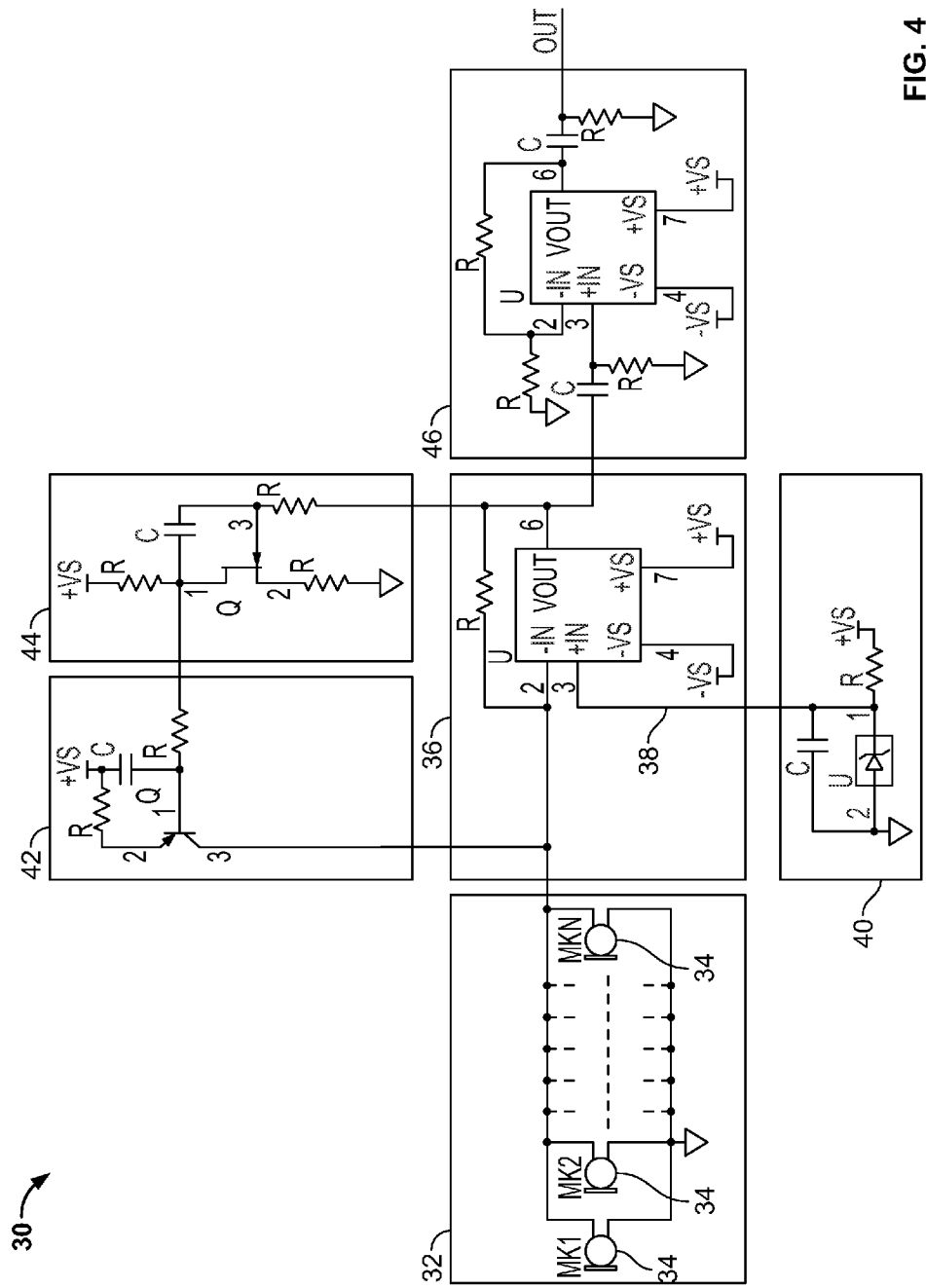
FIG. 4 is an electrical schematic diagram of the acoustic sensor of FIG. 3.

FIG. 4 shows an electrical schematic diagram of an embodiment of the electret condenser microphone array of FIG. 3. Reference numbers are the same as those used for corresponding elements discussed with respect to FIG. 3.

Figure 5:
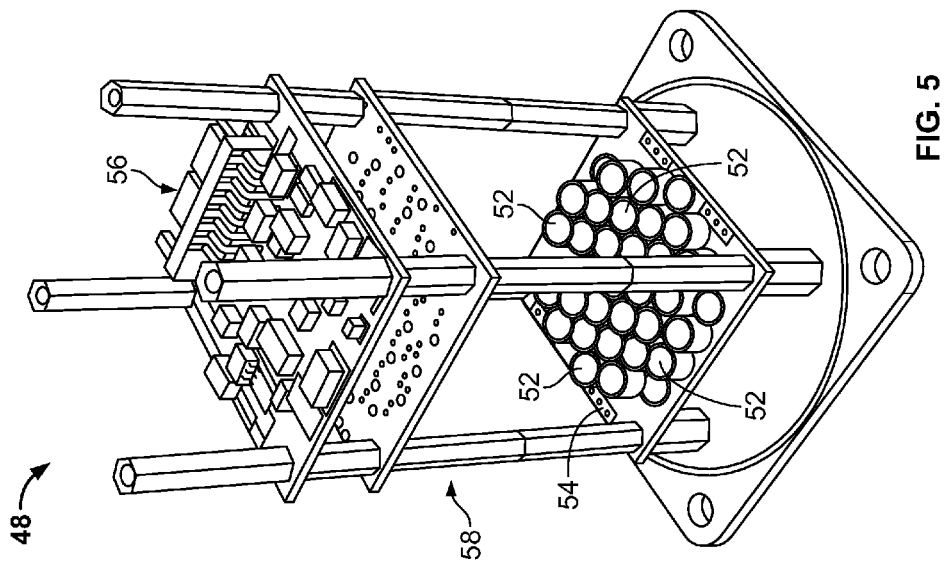
FIG. 5 is a schematic perspective view of an acoustic sensor assembly in accordance with an embodiment of the present invention.

FIG. 5 is a schematic perspective view of an acoustic sensor assembly 48 in accordance with an embodiment of the present invention. In this embodiment, 74 electret microphone capsules (not shown) are used in compact groups of 37 microphones, of which microphones 52 are representative. The assembly 48 includes the microphone cluster 54 and data acquisition and processing electronics 56 on a support 58.

Figure 6:
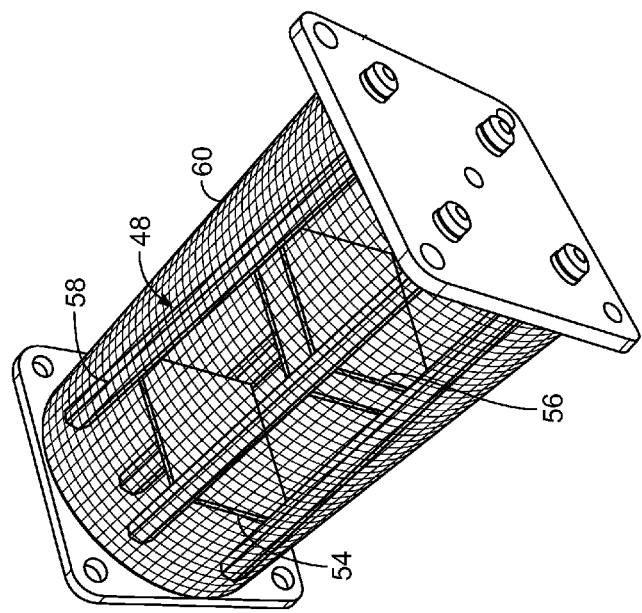
FIG. 6 is a schematic perspective view of the acoustic sensor assembly of FIG. 5 inside a conductive mesh according to an embodiment of the present invention.

FIG. 6 is a schematic perspective view of the acoustic sensor assembly 48 of FIG. 5 in a conductive mesh 60 that serves as a shield from electromagnetic interference and mechanical impact.

Figure 7:
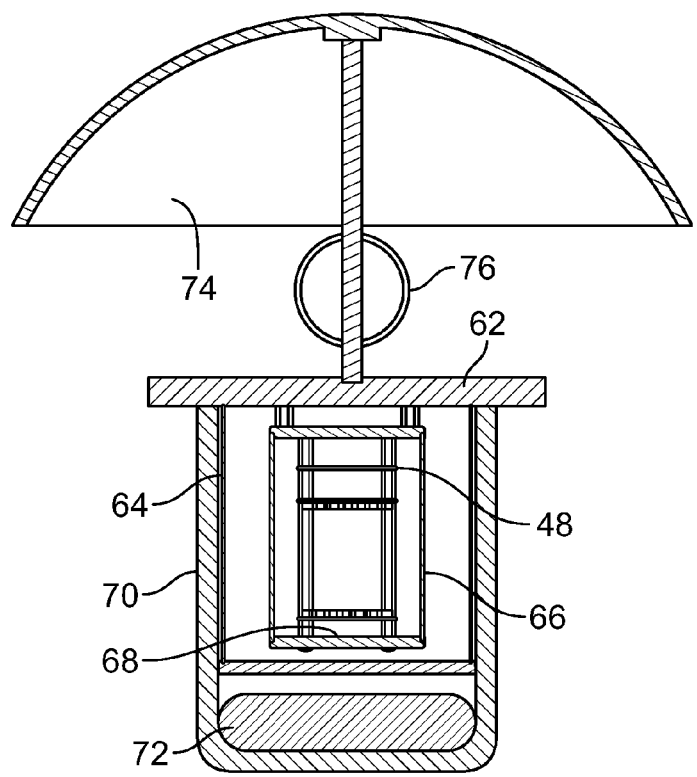
FIG. 7 is a schematic front cross-sectional view of the acoustic sensor assembly of FIG. 6 combined with environmental protection elements in accordance with an embodiment of the present invention.

FIG. 7 is a schematic front cross-sectional view of the acoustic sensor assembly 48 of FIG. 6 combined with environmental protection elements 62, 64, 66, 68, 70, 72, 74 in accordance with an embodiment of the present invention. The sensor assembly 48 is mounted on a base 62 placed into a semi-rigid, acoustically transparent cage 64 that is also attached to base 62. The sensor assembly 48 is covered by a plastic membrane 66 that protects it from moisture. In an embodiment, the cage 64 is a cylinder made of conductive mesh, and is connected to a metal plate 68 at the bottom of the assembly 48 and the sensor base 62 at the top of the assembly 48. The cage 64 is covered by a wind screen 70 that may consist of faux fur, foam or other suitable wind screen materials that would not interfere substantially with acoustic signals. At the bottom of the cage 64, an electrical actuator 72 is installed. In this embodiment, the electrical actuator is a shaker 72 capable of inducing vibration in the assembly 48 to remove any ice or snow accumulations. At the top, the assembly is covered from direct rain or snow by a canopy 74. A supporting member (e.g., tube 76) may be provided to support the assembly in place.

Figure 8:
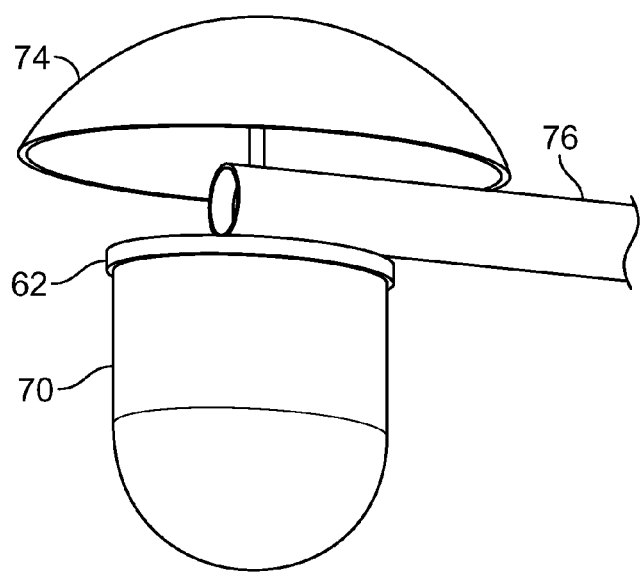
FIG. 8 is a schematic perspective view of the assembly of FIG. 7.

FIG. 8 is a schematic perspective view of the combination of the assembly 48 and environmental elements 62, 70, 74 discussed with respect to FIG. 7.

Figure 9:
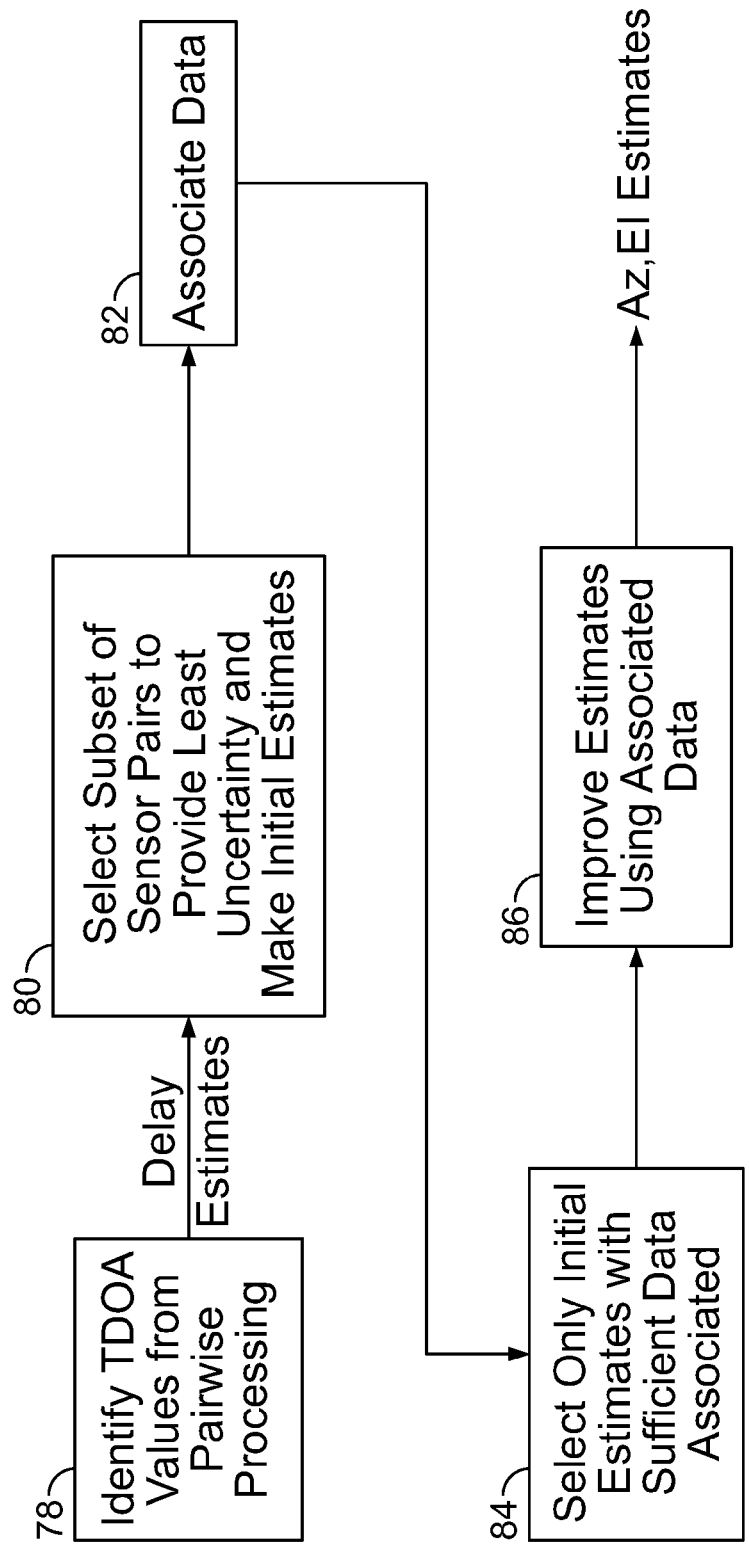
FIG. 9 is a schematic functional block diagram of a method for directional location of an acoustic source in three dimensions with multiple source separation in accordance with an embodiment of the present invention.

FIG. 9 is a schematic functional diagram of a method for directional location of an acoustic source in three dimensions with multiple source separation in accordance with an embodiment of the present invention. The main steps of the method are: identifying TDOA values from pair-wise processing of sensor data (block 78), thereby obtaining delay estimates; selecting a subset of sensor pairs to provide the least uncertainty and make initial estimates of the directional location of the acoustic source (block 80); associating data derived from the sensor pairs (block 82); selecting only the initial estimates that have sufficient associated data (block 84); and improving the estimates using the associated data (block 86), thereby obtaining estimates of the azimuth Az and elevation angle El.

A three-dimensional estimate of direction of acoustic wave arrival, as defined by azimuth Az, measured easterly relative to true geographical north, and elevation angle El measured upward from the ground plane, can be acquired from TDOA measured by two differently-oriented pairs of sensors. A coordinate system may be defined where the z-axis is oriented parallel to the jth sensor pair, and the ith sensor pair is parallel to the plane y-z. The direction of arrival can be defined as:

$$El''=\sin^{-1}(c\tau_j/L_j), \qquad (Eq.\ 2)$$

where El" is the angle from the x-y plane $$Az''=\pm\cos^{-1}((c\tau_i-\Delta z_i \sin El'')/\Delta y_i \cos El''), \qquad (Eq.\ 3)$$

where $\tau_i$ is the delay measured by ith sensor pair, Az" the clockwise angle from the y-axis, coordinate, $L_i$ is the length of sensor separation in ith sensor pair, $\Delta z_i$, $\Delta y_i$ are differences between the sensor coordinates z and y within ith sensor pair. This approach results in ambiguity, producing two possible estimates of the direction of arrival. The actual direction of arrival can be found by rotating the result in reverse of the rotation that was used to transform the sensor coordinates into the current coordinates. This procedure may also result in ambiguity, which can be resolved by processing additional sensor pairs or having prior knowledge of a possible range of target positions.

Since multiple acoustic sources may be present, the data association problem mentioned above may be resolved as discussed herein. For each direction of arrival, there is a minimal subset of sensor pairs (two sensor pairs for three dimensions or one sensor pair for two dimensions) that provides a best estimate of direction. Knowing, or having an assumption, about the uncertainty of the TDOA finding, the expected accuracy of measurement can be estimated for a given direction of arrival estimate and a given subset of sensor pairs using linearization of measurement equations $$P = \begin{bmatrix} \sigma^2_{Az} & \sigma^2_{Az,El} \\ \sigma^2_{Az,El} & \sigma^2_{El} \end{bmatrix} = (H^T R^{-1} H)^{-1} \qquad (Eq.\ 4)$$

where $$H = \begin{bmatrix} \delta\tau/\delta Az & \delta\tau/\delta El \\ \delta\tau/\delta Az & \delta\tau/\delta El \end{bmatrix} \qquad (Eq.\ 5)$$

is a measurement matrix and $$R = \begin{bmatrix} \sigma^2_{\tau 1} & 0 \\ 0 & \sigma^2_{\tau 2} \end{bmatrix} \qquad (Eq.\ 6)$$

is the covariance matrix of delay estimates from two sensor pairs, assuming the errors are independent.

Acquiring all possible direction of arrival estimates defined by the TDOA as found by respective sensor pairs, one can select only those produced by sensor pairs providing the lowest uncertainty for the direction corresponding to that estimate. For such direction estimates, a theoretical TDOA can be found that would be expected as a result of a wave arriving from those directions given the sensor placement. TDOA from all sensor pair estimates can be matched to the direction estimates (for example, by finding the nearest-neighbor TDOA estimate in a sensor pair to theoretical TDOA for a given DOA). Such matches can be discarded where the difference between theoretical delay and associated delay measurement is above a certain threshold. If the number of matches corresponding to a direction estimate is less than a set threshold, it is discarded. The remaining direction estimates are likely to be connected with separate sources and the associated delays can be used to improve the initial estimate by fusing associated estimates for example, but not limited to, using a least-squares method or Kalman filter "update" step.

Figure 10:
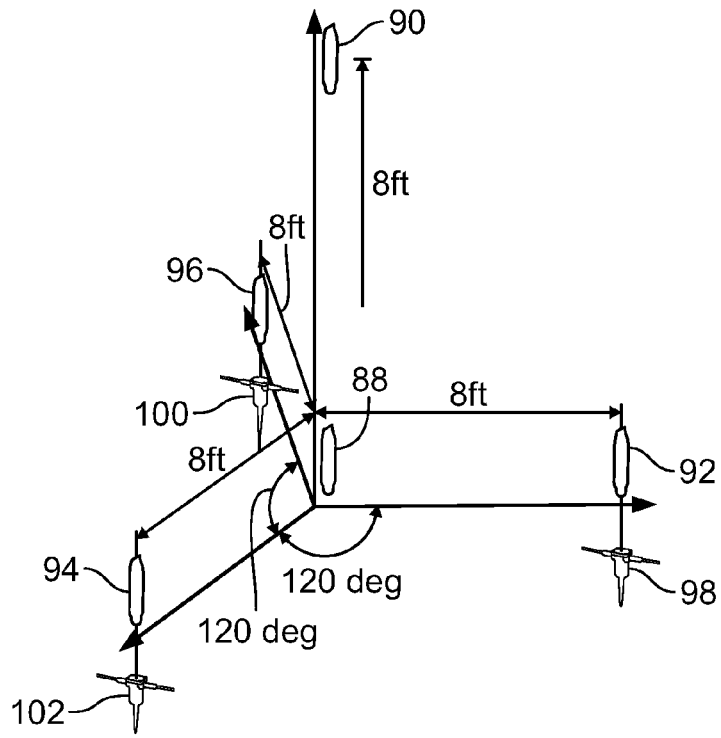
FIG. 10 is a schematic diagram illustrating a configuration of a sensor cluster that contains one pair of sensors oriented vertically for the purpose of simplifying a direction-of-arrival determination in accordance with an embodiment of the present invention.

This embodiment of the method of the invention can be greatly simplified if one of the sensor pairs within the cluster is oriented vertically, as the elevation angle can be unambiguously determined. An example of such a sensor cluster is shown in FIG. 10. It can be seen in FIG. 10 that one of the pairs of microphone sensors is oriented vertically (i.e., microphones 88, 90), whereas the other sensors (i.e., microphones 92, 94, 96 and geophones 98, 100, 102) and one member of the aforesaid sensor pair (i.e., microphone 88) are deployed in a plane, which is perpendicular to the line of the vertical pair (i.e., microphones 88, 90), and may be parallel to the ground (not shown). The vertical microphone pair 88, 90 can be processed first, and all further pair subsets used for direction estimation can consist of this vertical pair and one other sensor pair (e.g., microphones 92, 94). For the coordinate transformation needed for the calculation discussed above, the z-axis can be oriented along the line connecting the sensors within the vertical pair (i.e., microphone 88, 90). This orientation will not change for all the thusly chosen subsets, therefore the El" calculation can be reused, and will be equal to a true elevation estimate relative to ground plane.

Figure 11:
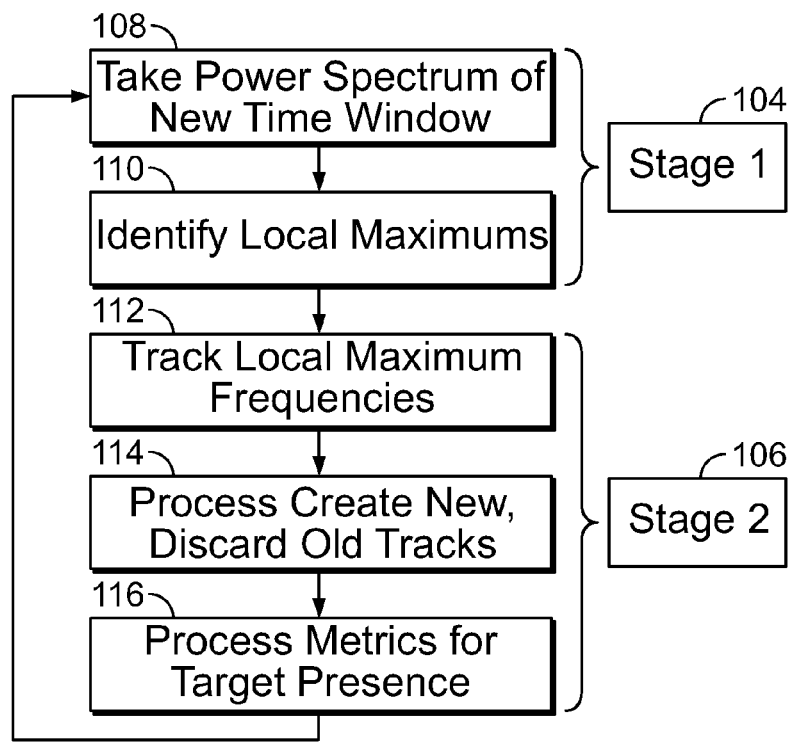
FIG. 11 is a block diagram of the stages of a method for detecting the presence of an acoustic source in accordance with an embodiment of the present invention.

FIG. 11 is a block diagram of the stages of a method according to an embodiment of the present invention for detecting the presence of a target producing noise that contains persistent tonal components. This embodiment can be separated into two stages (i.e., Stage 1 (block 104) and Stage 2 (block 106). Stage 1 of the method includes the general steps of taking a power spectrum over a new time window (block 108), and identifying local maximums (block 110). Stage 2 of the method includes the general steps of tracking local maximum frequencies (block 112), performing a process to create new tracks and discard old tracks (block 114), and processing metrics defining a target's presence (block 116).

Figure 12:
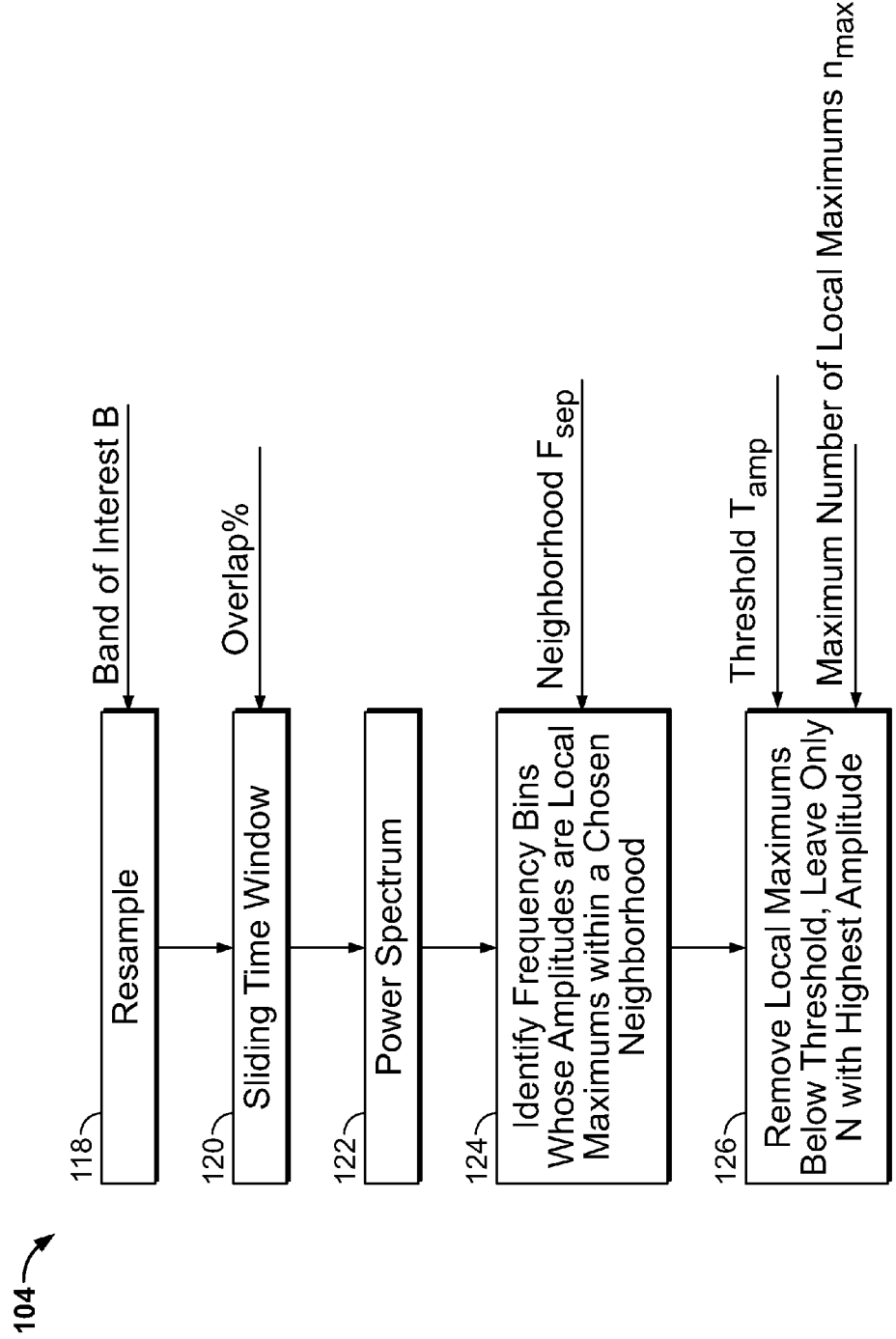
FIG. 12 is a block diagram illustrating the first stage of a method for detecting the presence of an acoustic source in accordance with an embodiment of the present invention.
Figure 13:
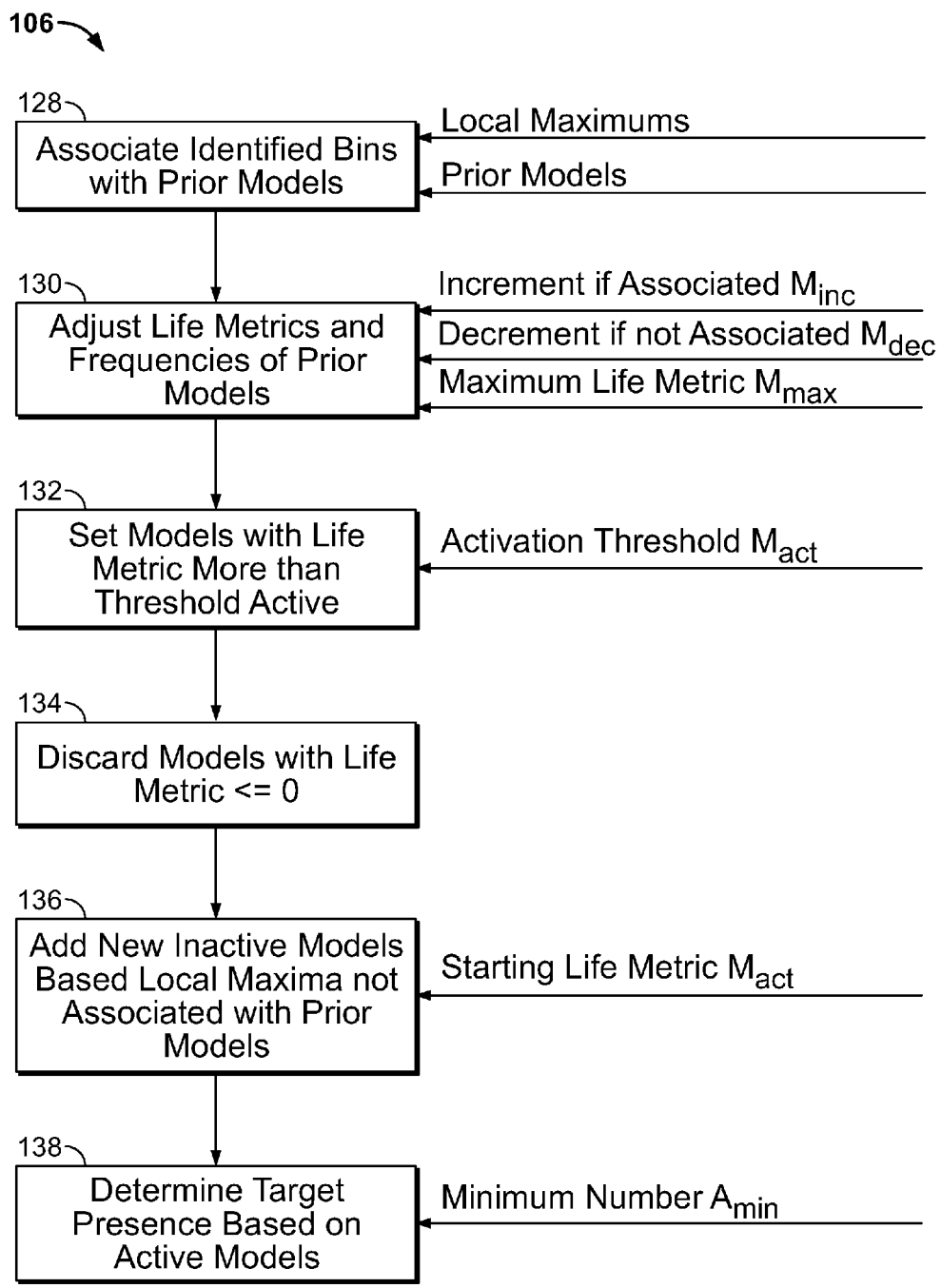
FIG. 13 is a block diagram illustrating the final stage of a method for detecting the presence of an acoustic source in accordance with an embodiment of the present invention; and, FIG. 14 is a reproduction of a spectrogram showing the results of utilizing a presence detection and feature extraction algorithm in accordance with an embodiment of the present invention.
Figure 14:
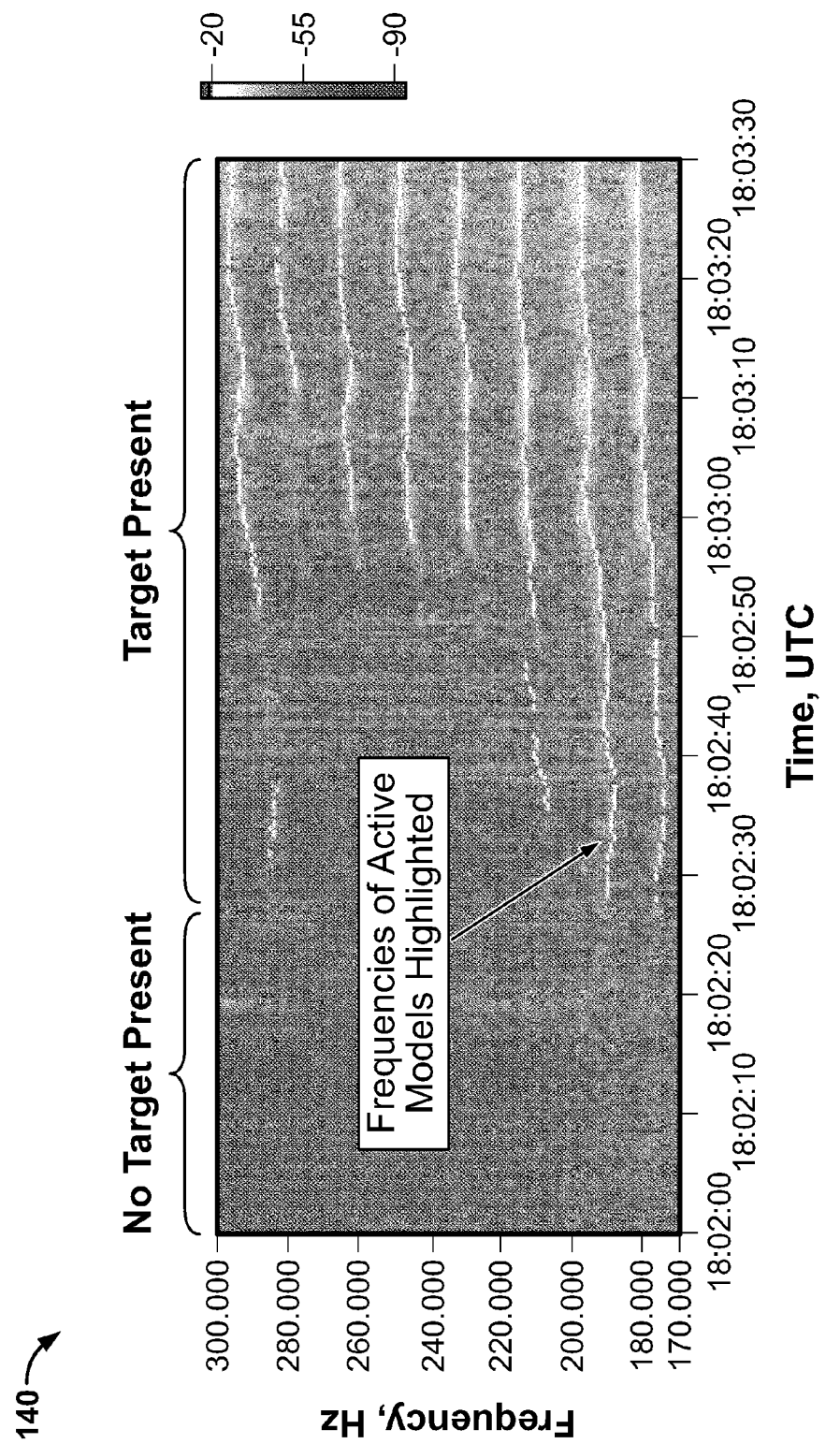

FIG. 12 is a block diagram illustrating the first stage of the embodiment (i.e., Stage 1), which is used to obtain the information that is the input for the second stage of the embodiment (i.e., Stage 2), which is shown in the block diagram of FIG. 13. Referring first to FIG. 12, a first step is to acquire the power spectrum of the sampled signal in one channel across a sliding time window with some set overlap (block 108). The power spectrum may also be averaged. If the signals are expected to be limited to a band of interest B, then the discredited signal may be downsampled to a sampling rate B/2 according to the Nyquist rate. Then the bins for which amplitudes are greater than those of all bins within a set frequency neighborhood $F_{sep}$ are identified as local maximums (block 110). In another embodiment, the maximums may be identified within one or more arbitrary subsets of frequency bins resulting from spectral analysis, thus, possibly, simplifying the problem to finding the bin with the maximum amplitude within a set, and, possibly, blocking the effect band-limited interfering signals, by excluding affected bins from the set under consideration. The resulting local maximums are further processed to exclude the ones that have amplitudes below a set threshold $T_{amp}$. If more than a set number $n_{max}$ of maximums are identified, then only $n_{max}$ results with the highest amplitudes of all the identified maximums are kept for Stage 2 (block 106).

Turning now to FIG. 13, which is a block illustrating Stage 2 of the process, Stage 2 of the method provides a tracker that operates on a number of models of persistent tonal signal that consist of the associated frequency $F_{model}$ and life metric $M_{life}$. Initially, the tracker has zero models. Each model can have two states called "active" or "inactive". For each spectrum, the local maximums are associated to models in the tracker stage that have frequency within a set neighborhood $F_{assoc}$. The model is then updated with the associated frequency by setting the frequency of the model to a weighted average of the associated local maximum and the model's frequency. The models that have associated local maximums from current slice have their life metrics $M_{life}$ increased by value $M_{inc}$, other have it decreased $M_{dec}$. If $M_{life}$ for a model is incremented past a certain number $M_{max}$, the $M_{life}$ for that model is set to $M_{max}$ (block 112). The local maximums that do not have an associated model used to create models having a starting value $M_{start}$, and being in an inactive state. For those models that have $M_{life}$ greater than $M_{act}$, the state is set to active. If a $M_{life}$ for any model is less than zero, that model is destroyed (block 112). The target presence is then established by the number of active models (block 114).

In an embodiment, Stage 1 processing can be applied to signals acquired from different sensors in simultaneous time windows, or even different type sensors (e.g. acoustic sensors and seismic sensors). Stage 2 processing is then applied to the output of Stage 1 sequentially to fuse the output. Target presence is considered to be detected if at least $A_{min}$ models exist and are in an active state, otherwise the method declares that no target is present. The number of active models, their frequencies and amplitudes may be considered to be a feature vector that may be input into a classification algorithm to additionally facilitate target classification by their acoustic signature.

The method discussed above can be used for presence detection in signals acquired from acoustic, hydroacoustic, or seismic sensors. The method can provide a general alert for presence of a wide class of targets (e.g., single-engine or double-engine airplanes, ultralight aircraft, helicopters, cars, jet skis, or boats), and to trigger other functionalities of the system such as recording or data transmission. The ability to selectively trigger system functionalities enables the system to run only at times when a target is present, which may be useful when the resources available for said functionalities are limited (e.g., the storage capacity for recording, bandwidth, or power for communication).

The following is a disclosure, by way of example, of a computing device which may be used with the systems and methods disclosed above. The description of the various components of a computing device is not intended to represent any particular architecture or manner of interconnecting the components. Other systems that have fewer or more components may also be used with the disclosed subject matter. A communication device may constitute a form of a computing device, and may at least include, contain, utilize, or emulate a computing device. The computing device may include an interconnector (e.g., bus and system core logic), which can interconnect such components of a computing device to a data processing device, such as a processor(s) or a microprocessor(s) or a controller(s), or other form of partly or completely programmable or pre-programmed device (e.g., hard wired and/or application-specific integrated circuit ("ASIC")), customized logic circuitry, such as may implement a controller or microcontroller, a digital signal processor, or any other form of device that can fetch and perform instructions, operate on pre-loaded/pre-programmed instructions, and/or follow instructions found in hard-wired or customized circuitry, such as the above-noted forms of hard-wired circuitry containing logic circuitry, in order to carry out logic operations that, together, perform steps of and whole processes and functionalities as described in the present disclosure.

In the following description, various functions, functionalities and/or operations may be described as being performed by or caused by software program code to simplify the description. However, those skilled in the art will recognize that what is meant by such expressions is that the functions resulting from execution of the program code/instructions are performed by a computing device as described above, (e.g., including a processor, such as a microprocessor, microcontroller, logic circuit, or the like, noted above). Alternatively, or in combination, the functions and operations can be implemented using special-purpose circuitry, with or without software instructions, such as using an ASIC or a Field-Programmable Gate Array(s) (FPGA), which may be programmable, partly programmable, or hard wired. The ASIC logic may be such as gate arrays or standard cells, or the like, implementing customized logic by metalization(s) interconnects of the base gate array ASIC architecture or selecting and providing metalization(s) interconnects between standard cell functional blocks included in a manufacturer's library of functional blocks, etc. Embodiments can thus be implemented using hardwired circuitry without program software code/instructions, or in combination with circuitry using programmed software code/instructions.

Thus, the techniques discussed herein are limited neither to any specific combination of hardware circuitry and software, nor to any particular tangible source for the instructions executed by the data processor(s) within the computing device, such as a tangible machine readable medium. In other words, as an example only, part or all of the machine-readable medium may in part, or in full form, a part of, or be included within, the computing device itself (e.g., as the above-noted hard wiring or pre-programmed instructions in any memory utilized by or in the computing device).

While some embodiments can be implemented in fully-functioning computers and computer systems, various embodiments are capable of being distributed as a computing device including, for example, a variety of architecture(s), form(s) or component(s). Embodiments may be capable of being applied regardless of the particular type of machine or tangible machine/computer readable media used to actually effect the performance of the functions and operations and/or the distribution of the performance of the functions, functionalities and/or operations.

The interconnect may connect the data processing device to defined logic circuitry including, for example, a memory. The interconnect may be internal to the data processing device, such as coupling a microprocessor to on-board cache memory, or external (to the microprocessor) memory such as main memory, or a disk drive, or external to the computing device, such as a remote memory, a disc farm or other mass storage device(s), etc. Commercially-available microprocessors, one or more of which could be a computing device or part of a computing device, include a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation, as examples.

The interconnect, in addition to interconnecting elements such as microprocessor(s) and memory, may also interconnect such elements to a display controller and/or display device, and/or to other peripheral devices such as an input/output (I/O) device(s), (e.g., through an input/output controller(s)). Typical I/O devices may include a mouse, a keyboard(s), a modem(s), a network interface(s), a printer(s), a scanner(s), a digital or video camera(s), and other devices which are well known in the art. The interconnect may include one or more buses connected to one another through various forms of a bridge(s), a controller(s), and/or an adapter(s). In one embodiment an I/O controller may include a USB (Universal Serial Bus) adapter for controlling a USB peripheral(s), and/or an IEEE-1394 bus adapter for controlling an IEEE-1394 peripheral(s).

The storage device, (i.e., memory) may include any tangible machine-readable media, which may include but are not limited to recordable and non-recordable type media such as a volatile or non-volatile memory device(s), such as volatile RAM (Random Access Memory), typically implemented as a dynamic RAM (DRAM) which requires power continually in order to refresh or maintain the data in the memory, and a non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. A server can be utilized, for example, in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with another computing device(s) positioned locally or remotely to execute instructions, for example, to perform certain algorithms, calculations and other functions as may be included in the operation of the system(s) and method(s) of the disclosed subject matter, as disclosed in the present application.

At least some aspects of the disclosed subject matter can be embodied, at least in part, in programmed software code/instructions. That is, the functions, functionalities and/or operations and techniques may be carried out in a computing device or other data processing system in response to its processor, such as a microprocessor, executing sequences of instructions contained in a memory or memories, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as a "computer program(s)," or "software." The computer program(s) typically comprise instructions stored at various times in various tangible memory and storage devices, for example, in a computing device, such as in cache memory, main memory, internal disk drives, and/or forms of external memory noted above, such as remote storage devices, such as a disc farm, remote memory or databases, such as those, for example, accessed over a network such as the Internet. When read and executed by a computing device, (e.g., by a processor(s) in the computing device), the computer program causes the computing device to perform a method(s), (e.g., process and operation steps) to execute an element(s) as part of some aspect(s) of the system(s) or method(s) of the disclosed subject matter.

A tangible machine-readable medium can be used to store software and data that, when executed by a computing device, causes the computing device to perform a method(s) as may be recited in one or more accompanying claims defining the disclosed subject matter. The tangible machine-readable medium may include storage of the executable software program code/instructions and data in various tangible locations as noted above. Further, the program software code/instructions can be obtained from remote storage, including, without limitation, centralized servers or peer-to-peer networks and the like. Different portions of the software program code/instructions and data can be obtained at different times and in different communication sessions or in a same communication session with one or many storage locations.

The software program code/instructions and data can be obtained in their entirety prior to the execution of a respective software application by the computing device. Alternatively, portions of the software program code/instructions and data can be obtained dynamically, (e.g., "just in time"), when needed for execution. Alternatively, some combination of these ways may be used for obtaining the software program code/instructions and data may occur. As an example, for different applications, components, programs, objects, modules, routines or other sequences of instructions or organization of sequences of instructions. Thus, it is not required that the data and instructions be on a single machine-readable medium in entirety at any particular instant of time or at any instant of time ever.

In general, a tangible machine-readable medium can include any tangible mechanism that provides (i.e., stores) information in a form accessible by a machine (e.g., a computing device), which may be included, for example, in a communication device, a network device, a personal digital assistant, a mobile communication device, whether or not able to download and run applications from the communication network, such as the Internet (e.g., an iPhone®, Blackberry®, Droid™ or the like), a manufacturing tool, or any other device including a computing device, comprising, for example, one or more data processors, or similar components. In an embodiment(s), a user terminal can be a computing device, such as in the form of or included within a PDA, a cellular phone, a notebook computer, a personal desktop computer, etc. Alternatively, any traditional communication client(s) may be used in some embodiments of the disclosed subject matter. While some embodiments of the disclosed subject matter have been described in the context of fully-functioning computing devices and computing systems, those skilled in the art will appreciate that various embodiments of the disclosed subject matter are capable of being distributed in a variety of forms (e.g., as a system, method and/or software program product), and are capable of being applied regardless of the particular type of computing device machine or machine readable media used to actually effect the distribution.

The disclosed subject matter may be described with reference to block diagrams and operational illustrations or methods and devices to provide the system(s) and/or method(s) according to the disclosed subject matter. It will be understood that each block of a block diagram or other operational illustration (herein collectively, "block diagram"), and combination of blocks in a block diagram, can be implemented by means of analog or digital hardware and computer program instructions. These computing device software program code/instructions can be provided to the computing device such that the instructions, when executed by the computing device, (e.g., on a processor within the computing device or other data processing apparatus), the program software code/instructions cause the computing device to perform functions, functionalities and operations of the system(s) and/or method(s) according to the disclosed subject matter, as recited in the accompanying claims, with such functions, functionalities and operations specified in the block diagram.

It will be understood that in some possible alternate implementations, the function, functionalities and operations noted in the blocks of a block diagram may occur out of the order noted in the block diagram. For example, the function noted in two blocks shown in succession can in fact be executed substantially concurrently or the functions noted in blocks can sometimes be executed in the reverse order, depending upon the function, functionalities and operations involved. Therefore, the embodiments of the system(s) and/or method(s) presented and described as a flowchart(s) in the form of a block diagram in the present application are provided by way of example only, and in order to provide a more complete understanding of the disclosed subject matter. The disclosed flow and concomitantly the method(s) performed as recited in the accompanying claims are not limited to the functions, functionalities and operations illustrated in the block diagram(s) and/or logical flow(s) presented in in the disclosed subject matter. Alternative embodiments are contemplated in which the order of the various functions, functionalities and operations may be altered and in which sub-operations described as being part of a larger operation may be performed independently or performed differently than illustrated or not performed at all.

Although some of the drawings may illustrate a number of operations in a particular order, functions, functionalities and/or operations which are not now known to be order dependent, or become understood to not be order dependent, may be reordered. Other functions, functionalities and/or operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) of these, co-located or remotely located, at least in part, from each other, (e.g., in arrays or networks of computing devices), over interconnected networks, including the Internet, and the like.

The disclosed subject matter is described in the present application with reference to one or more specific exemplary embodiments thereof. Such embodiments are provided by way of example only. It will be evident that various modifications may be made to the disclosed subject matter without departing from the broader spirit and scope of the disclosed subject matter as set forth in the appended claims. The specification and drawings are, accordingly, to be regarded in an illustrative sense for explanation of aspects of the disclosed subject matter rather than a restrictive or limiting sense. Numerous variations, changes, and substitutions will now occur to those skilled in the art without departing from the disclosed subject matter. It should be understood that various alternatives to the embodiments of the disclosed subject matter described as part of the disclosed subject matter may be employed in practicing the disclosed subject matter. It is intended that the following claims define the scope of the disclosed subject matter and that methods and structures within the scope of these claims and their equivalents be covered by the following claims.

What is claimed is:

1. A passive acoustic sensing system comprising at least one cluster of at least four acoustic sensors having a data connection with a computing device, the at least one cluster of at least four acoustic sensors arranged in a polyhedral arrangement with at least one of the acoustic sensors of the cluster at each vertex of the polyhedral arrangement and at least one of the acoustic sensors of the cluster being an upper acoustic sensor that is at a position above a plane described by at least three other acoustic sensors of the cluster, each acoustic sensor of the cluster of acoustic sensors being configured to receive acoustical signals generated by at least one target and propagating from the at least one target to the at least one cluster of at least four acoustic sensors through air, the computing device configured to receive the acoustical signals from the at least one cluster of at least four acoustic sensors via the data connection and to process the acoustical signals and provide at least one of (a) a detection of presence of the at least one target, (b) a determination of direction of arrival of an acoustic wave emitted by the at least one target, and (c) a classification of the at least one target, wherein the at least one cluster of at least four acoustic sensors includes a minimal subset of sensors selected by an algorithm running on the computing device to provide an estimate of the direction of arrival of the acoustic wave such that the estimate has the lowest uncertainty corresponding to the minimal subset of sensors, based on geometry of the sensor arrangement in the minimal subset.

2. The passive acoustic sensing system of claim 1, further comprising at least one other cluster of at least four acoustic sensors, the at least one other cluster of at least four acoustic sensors arranged in another polyhedral arrangement with at least one of the acoustic sensors of the cluster at each vertex of the another polyhedral arrangement and at least one of the acoustic sensors of the at least one other cluster being another upper acoustic sensor that is at a position above a plane described by three other acoustic sensors of the at least one other cluster of at least four acoustic sensors, each acoustic sensor of the at least one other cluster of at least four acoustic sensors being configured to receive acoustical signals generated by the at least one target and propagating from the at least one target to the at least one other cluster of at least four acoustic sensors through air, wherein the computing device is configured to process the acoustical signals received from the at least one cluster of at least four acoustic sensors and the at least one other cluster of at least four acoustic sensors and provide localization of the at least one target.

3. The passive acoustic sensing system of claim 1, further including at least one seismic wave sensor configured to receive signals propagated through the ground.

4. The passive acoustic sensing system of claim 2, further including at least one pair of seismic wave sensors configured to receive signals propagated through the ground.

5. The passive acoustic sensing system of claim 3, wherein the cluster of at least four acoustic sensors includes a plurality of interfaced sensor elements.

6. The passive acoustic sensing system of claim 4, wherein the at least one pair of seismic wave sensors includes a plurality of interfaced sensor elements.

7. The passive acoustic sensing system of claim 1, wherein the computing device is further configured to extract and track at least one tonal component in a spectrum of a signal acquired by at least one acoustic sensor of the at least one cluster of at least four acoustic sensors, and to provide target presence detection based upon the at least one tonal component.

8. The passive acoustic sensing system of claim 2, wherein the computing device is further configured to extract and track at least one narrow band component in a spectrum of a signal acquired by at least one acoustic sensor of the at least one cluster of at least four acoustic sensors and/or at least one acoustic sensor of the at least one other cluster of at least four acoustic sensors, and to provide target presence detection based upon at least one narrow band component.

9. The passive acoustic sensing system of claim 1, wherein the computing device is further configured to extract and track at least one tonal component in a spectrum of a signal acquired by at least one acoustic sensor of the at least one cluster of at least four acoustic sensors, and provide target classification based upon the at least one tonal component.

10. The passive acoustic sensing system of claim 2, wherein the computing device is further configured to extract and track at least one tonal component in the spectrum of signal acquired by at least one acoustic sensor of the at least one cluster of at least four acoustic sensors and/or at least one acoustic sensor of the at least one other cluster of at least four acoustic sensors, and provide target classification based upon at least one tonal component.

11. The passive acoustic sensing system of claim 3, wherein the computing device is configured to fuse the signals received from the at least one seismic detector with the signals received from the at least one cluster of at least four acoustic sensors.

12. The passive acoustic sensing system of claim 4, wherein the computing device is configured to fuse the signals received from the at least one pair of seismic detectors with the signals received from the at least one cluster of at least four acoustic sensors and the at least one other cluster of at least four acoustic sensors.

13. The passive acoustic sensing system of claim 1, wherein the computing device is further configured to process the acoustical signals received by the upper acoustic sensor and at least one of the three other acoustic sensors of the cluster of at least four acoustic sensors and provide an estimate of the elevation of the at least one target.

14. The passive acoustic sensing system of claim 1, wherein the at least one target is a known type of target, and wherein the computing device is configured to (i) select multiple reference sets of target metrics, each reference set associated with a known type of target, each reference set including a reference set of local maximum amplitudes associated with a duration of time, each metric having a respective value, (ii) obtain samples of a power spectrum of a signal received from the at least one cluster of acoustic sensors, each sample obtained over a respective period of time, (iii) identify a set of local maximum amplitudes of the samples of the power spectrum of the signal, (iv) associate the set of local maximum amplitudes with the periods of times over which the samples having the local maximums were collected, (iv) create a set of signal metrics associated with the received signal from the set of local maximum amplitudes of the power spectrum and the periods of time associated with the set of local maximum amplitudes, each signal metric corresponding to one of the target metrics, each signal metric having a respective value, and (v) compare the respective values of the set of signal metrics associated with the received signal with the values of the target metrics in the multiple reference sets of target metrics associated with known types of targets, thereby identifying the reference set of target metrics having values that most closely match the values of the set of signal metrics associated with the received signal, whereby the at least one target is detected.

15. The passive acoustic sensing system of claim 1, wherein the computing device is configured to (i) associate the acoustic sensors in the cluster into sensor pairs, (ii) receive and process the signals from each sensor pair using a time-difference-of-arrival method to produce an estimated time delay for arrival of an acoustic wave emitted by the at least one target for each of the sensor pairs, each estimated time delay having an uncertainty associated with it, (iii) identify the estimated time delay having the lowest uncertainty associated with it, (iv) select the subset of sensor pairs for which the identified estimated time delay was produced, (v) make an initial estimate of the directional location of the acoustic source from the signals received from the selected subset of sensor pairs, (vi) improve the initial estimate using estimated time delays and estimated directional location of the acoustic source associated with adjacent sensor pairs, thereby obtaining estimates of the azimuth and elevation angle of the of the acoustic source, and (vii) determining the direction of arrival of an acoustic wave from the at least one target from the estimates of the azimuth and elevational angle.

16. The passive acoustic sensing system of claim 15, wherein the computing device is further configured to select a sensor pair including the upper acoustic sensor as a member pair of the subset of sensor pairs.

* * * * *

UNITED STATES PATENT AND TRADEMARK OFFICE
CERTIFICATE OF CORRECTION

PATENT NO. : 9,651,649 B1
APPLICATION NO. : 14/209548
DATED : May 16, 2017
INVENTOR(S) : Hady Salloum et al.

It is certified that error appears in the above-identified patent and that said Letters Patent is hereby corrected as shown below:

In the Specification

Column 1, Line 16, after the heading "Statement Regarding Federally Sponsored Research," please delete the ensuing paragraph and replace with the following:

-- This invention was made with government support under Grant Number HSHQDC-10-A-BOA35 awarded by the DHS/ST - Department of Homeland Security / Science & Technology. The government has certain rights in the invention. --

Signed and Sealed this
Third Day of August, 2021

Drew Hirshfeld
*Performing the Functions and Duties of the
Under Secretary of Commerce for Intellectual Property and
Director of the United States Patent and Trademark Office*